July 4, 1961
C. R. KUTIL
2,991,025
HOSE GUIDE
Filed Sept. 1, 1959
3 Sheets-Sheet 2
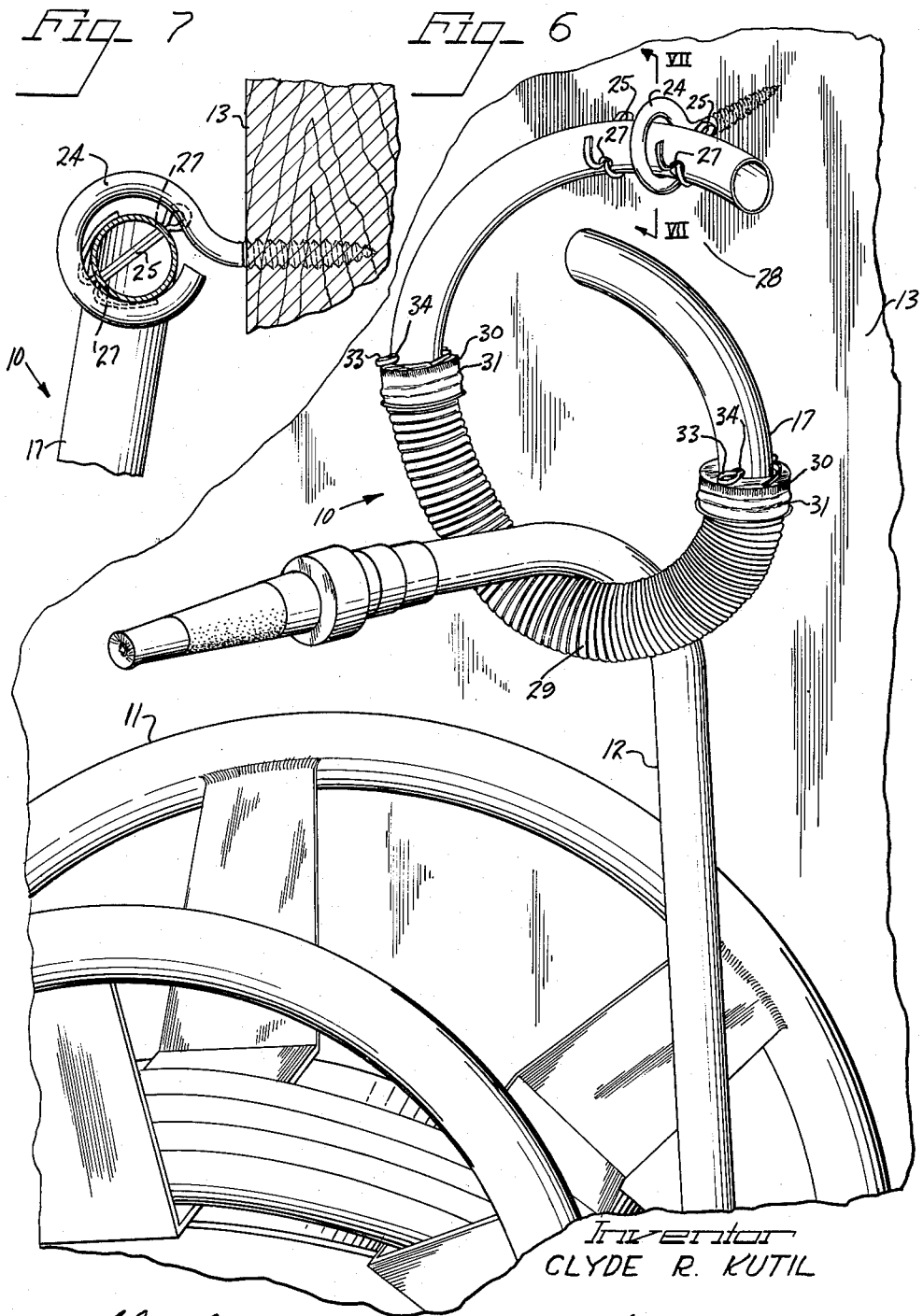
Inventor
CLYDE R. KUTIL July 4, 1961
C. R. KUTIL
2,991,025
HOSE GUIDE
Filed Sept. 1, 1959
3 Sheets-Sheet 3
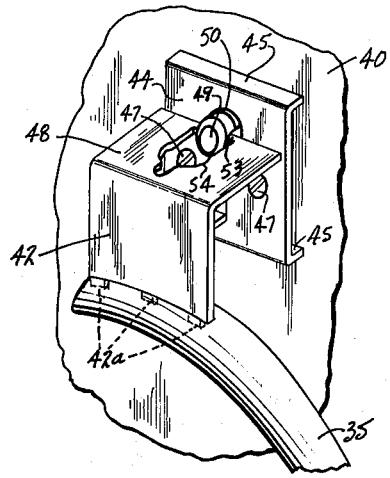
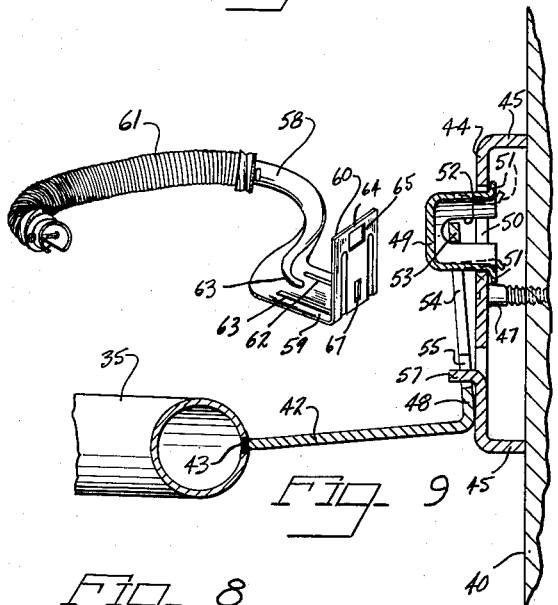
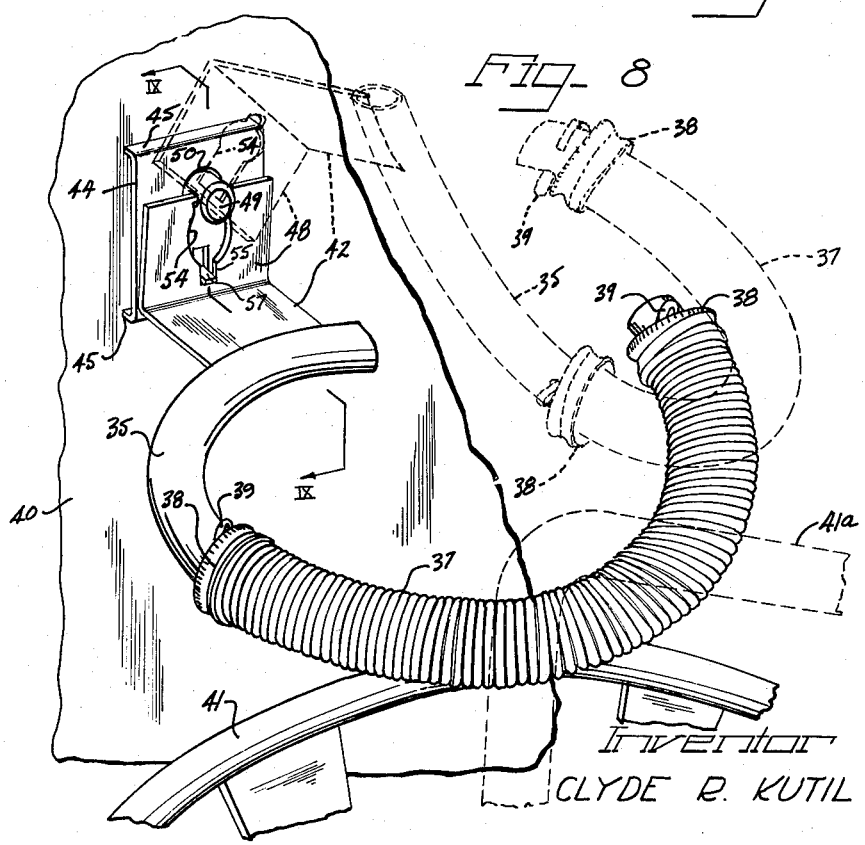
Inventor
CLYDE R. KUTIL

United States Patent Office 2,991,025
Patented July 4, 1961

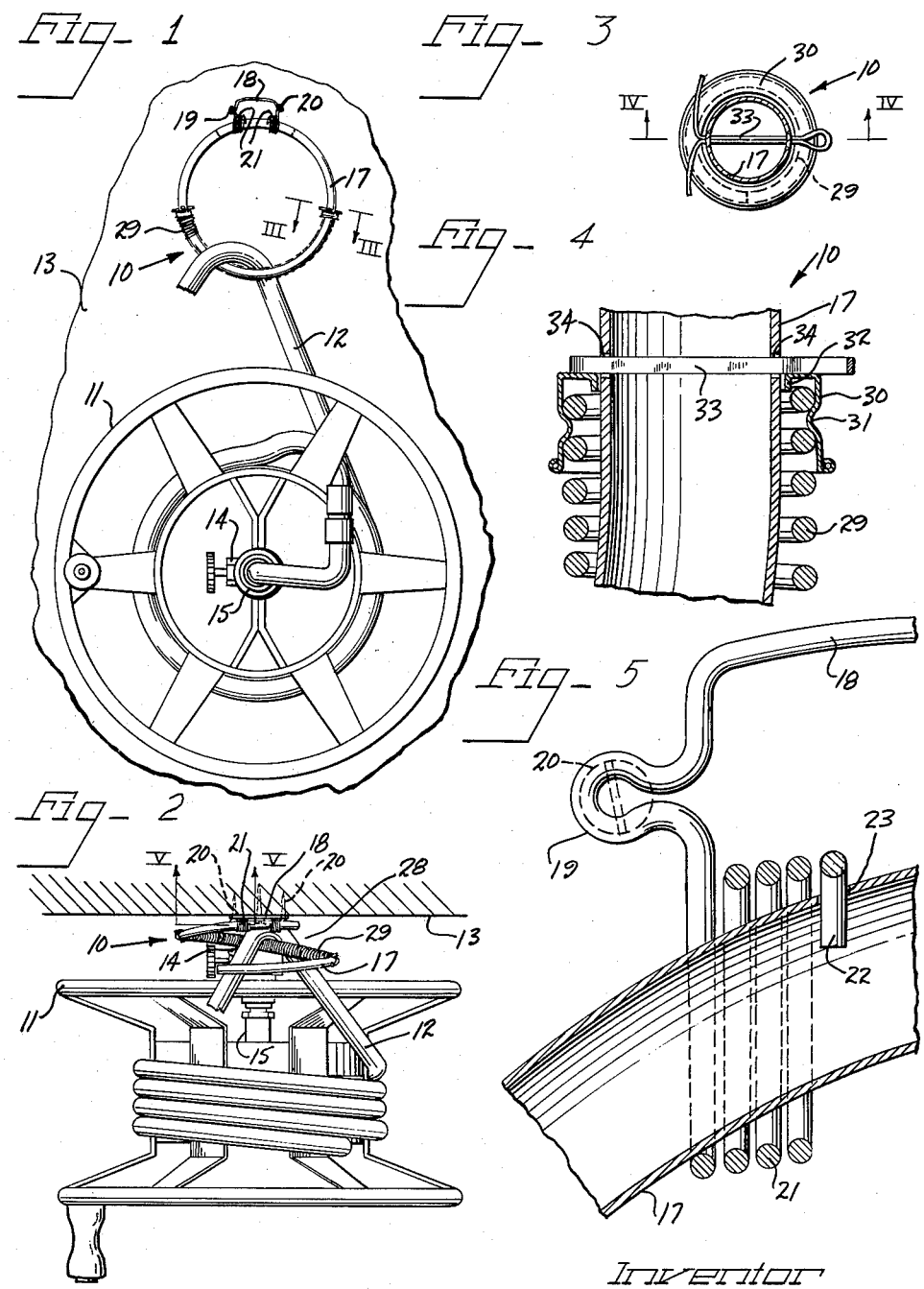

2,991,025
HOSE GUIDE
Clyde R. Kutil, 2521 Budd St., River Grove, Ill.
Filed Sept. 1, 1959, Ser. No. 837,446
6 Claims. (Cl. 242—157)

The present invention relates to improvements in means for facilitating the reeling out and the reeling in of especially garden hose, and more particularly affords useful advantageous results with respect to manipulation of hose carried on the direct fluid connection type reels, that is reels that have a connection through the axle structure thereof with a source of fluid to be dispensed through the hose carried by the reel.

When drawing hose from such a reel in a direction across the rim of the reel, that is, more or less in the direction of the axis of the reel, at least substantial drag of the hose across the reel rim and oftentimes binding occurs. The same problem presents itself when the hose is being reeled in.

Where a hose is not mounted on a reel, such as is common household practice, but the hose is left in a coiled or haphazard pile adjacent to the fluid outlet to which it may remain attached, kinking, pinching and knotting of the hose is a frequent, annoying experience as the hose is drawn out to the point of use.

Accordingly, it is an important object of the present invention to provide new and improved means to facilitate and simplify drawing hose freely and without binding or kinking or knotting from a supporting reel or from a coil or pile, as the case may be, and especially with respect to reel-supported hose aiding reeling in of the hose.

Another object of the invention is to provide new and improved means for guiding hose from or onto a reel without seizing or binding with respect to the rim of the reel although the hose is in movement across the reel rim.

A further object of the invention is to provide a new and improved hose guide structure which is simple and efficient in construction, can be produced and sold at low cost and can be easily installed.

Other objects, features and advantages of the present invention will be readily apparent from the following detailed description of certain preferred embodiments thereof taken in conjunction with the accompanying drawings, in which:

FIGURE 1 is a side elevational view of a hose reel and a hose guide embodying features of the invention;

FIGURE 2 is a top plan view of the assembly of FIGURE 1;

FIGURE 3 is a greatly enlarged fragmentary sectional elevational detail view taken substantially on the line III—III of FIGURE 1;

FIGURE 4 is a fragmentary sectional detail view taken substantially on the line IV—IV of FIGURE 3;

FIGURE 5 is a fragmentary sectional elevational detail view taken substantially on the line V—V of FIGURE 2;

FIGURE 6 is a fragmentary pictorial view of a slightly modified form of the hose guide associated with a hose reel and hose in a working relationship;

FIGURE 7 is an enlarged fragmentary sectional elevational detail view taken substantially on the line VII—VII of FIGURE 6;

FIGURE 8 is a pictorial illustration of another modified form of the device;

FIGURE 9 is an enlarged fragmentary sectional detail view taken on substantially the line IX—IX of FIGURE 8;

FIGURE 10 is a fragmentary pictorial view of the bracket structure of the device of FIGURE 8 showing the same in the collapsed relationship of the parts; and FIGURE 11 is a pictorial view of still another modification.

Referring to FIGURES 1 and 2, a hose guide 10 embodying features of the present invention is shown as associated with a hose reel 11 carrying a hose 12 which is adapted to be guided by the device 10, both the guide device and the reel being mounted on a suitable support 13 such as part of a building wall. In the illustrated form, the hose reel 11 is of the direct fluid connection type wherein fluid such as water from a valve controlled outlet fitting 14 is connected through a fluid conducting axle structure 15 of the reel to the hose 12.

A distinct virtue of the hose guide device 10 resides in the simplicity of its construction involving a minimum number of components and substantially foolproof operation. To this end, the guide device 10 includes a split-ring-like body 17 of suitable diameter and having a smooth circular outside diameter. Although the material of the body 17 may comprise suitable rod stock, it is desirably tubular material such as pipe or duct stock and may be as light in weight as is consistent with functional rigidity necessary to withstand the intended usage. Aluminum duct material has been found desirable for the purpose. In a suitable size for use with garden hose the outside diameter of the circular body ring may be about 10 to 12″ and the tube diameter ¾ to ⅞″. This provides an ample eye size for large range adaptability to hose movement through the eye and affords a large enough tube diameter for the intended purpose.

In use, the guide ring 10 is mounted in a position above the location from which the hose 12 is to be drawn and to which the hose is to be returned, such as the reel 11 or a receptacle of other type, or just a floor or the ground adjacent to a fluid outlet to which the hose is adapted to be attached, the mounting of the guide ring being such that the hose 12 can be threaded through the guide eye to be drawn over the inside diameter of the eye. In one form of means for mounting the guide ring 10, as shown in FIGURES 1, 2 and 5, a bracket 18 is provided which is suitably attached to the ring body 17 and has means for suitably attaching it to the support 13. Although the bracket 18 may take various forms, it is desirably constructed and arranged to enable at least some range of swinging movement of the guide ring 10 relative to the support 13 to facilitate hose drag relief orientation. In the bracket 18 this is effected by constructing the same from suitable gauge spring wire stock, generally in the form of a U-shaped bracket yoke having the side arms provided with respective screw eye loops 19 through which attachment screws 20 are engageable for securing the bracket to the support 13. On the end portion of each of the side arms is provided a multi-loop resilient spring portion coil 21 of larger inside diameter than the outside diameter of the ring body 17, encircling the ring body and having an inwardly projecting terminal lug 22 projecting in anchoring relation through a respective anchor hole 23 in the ring body 17, as best seen in FIGURE 5. Through this arrangement, although as shown in FIGURES 1 and 2 the ring member 10 normally hangs downwardly adjacent to the support 13, it is enabled by torsional yielding of the supporting bracket coils 21 to swing outwardly from the support 13 in response to hose drag or manual deflection. If preferred, however, the legs of the bracket 18 may be pre-bent or extended to project outwardly away from the support 13 for normally holding the guide ring 10 in a position projecting away from the support 13 but nevertheless swingable as permitted by the torsion spring coils 21 of the bracket.

In another exemplary form of supporting means for the ring guide 10 a bracket structure which will permit free swinging of the guide ring may be provided as shown in FIGURES 6 and 7, in this instance comprising an eye screw 24 having the eye thereof of suitably larger inside diameter than the outside diameter of the body tube 17 of the ring so that the ring is not only freely swingable toward and away from the support 13 but also may have a limited range of movement in diametrical directions. Spaced stops, conveniently in the form of cotter pins 25 extending through aligned holes 27 in the eye screw bracket engaged portion of the ring body 17 maintain the ring guide against circumferential displacement relative to the bracket.

A convenient aspect of the eye screw bracket 24 is that it enables mounting of the ring guide 10 without tools since the ring guide body 17 serves as a convenient torque applying medium for screwing the eye screw threaded shank into the support 13, where the material of the support 13 is of suitable character.

In order to facilitate entry of the hose 12 into the eye of the guide ring 10, the ring has its free ends relatively offset to provide an entry gap 28 (FIGS. 2 and 6) at least wide enough to permit the hose to be inserted into or removed from the ring by a lateral movement of the hose. Through this arrangement, although the hose is easily moved laterally or looped into the ring, the overhanging end portions of the guide ring and more particularly the end portion that is at the outer side of the ring provides adequate guard against escape of the hose should it tend to snake up due to overrunning of the reel or for any other reason. In FIGURES 1 and 2, the offset portions of the ring are shown as in generally overlapping spaced relation. In FIGURE 6 the end portions are somewhat shorter and are not necessarily overlapping but may be substantially parallel at the ends, resulting from offset relationship of a full loop without provision for overlap. In either form, the ring body 17 may readily be derived from a helical coil of the tubular stock material cut into suitable loop lengths to provide the guide ring body.

Anti-friction means are provided on the guide ring body 17 and more particularly on that portion thereof over which the hose 12 is drawn in use of the device. Such anti-friction means must be possessed of complete freedom from binding or sticking or jamming relative to either the hose or the ring body 17, and it must be disposed over an ample segment of the ring body to accommodate a full range of hose-guiding support within the eye of the ring. For example, it has been determined by experimentation that to accommodate a full range of angular draw-out and reeling-in support for the hose, a supporting segment of about 150° should be provided with anti-friction means.

In a highly desirable form, the anti-friction means comprises a helically coiled flexible member 29 of an inside diameter to clear the outside tube diameter of the ring body 17 in telescoped relation of the anti-friction member thereabout. As best seen in FIG. 4, the coils of the anti-friction member 29 are spaced apart sufficiently to avoid binding engagement of those portions of the coils which are at any moment at the inside of the ring due to the curvature which the helical anti-friction member must follow in that segment of the ring about which the anti-friction member is rotatably disposed as a sleeve. In this instance, the anti-friction member 29 is made from suitable heavy gauge wire coiled into sleeve-like form similarly as a helical tension spring. By virtue of its transverse flexibility and its free rotary clearance relation to the encompassed segment of the ring body 17, the anti-friction coiled sleeve member 29 is adapted to rotate freely about the ring body as the hose 12 is drawn across the ring body in engagement with the anti-friction sleeve member.

At its opposite ends, the anti-friction coil sleeve member 29 is provided with centering bearing and end cap means (FIGS. 3, 4 and 6) comprising respective cap members 30 which are preferably screw caps having screw thread means 31 engageable by a screw-on action with the endmost coils of the sleeve member 29. Centrally, each of the end cap members 30 has a clearance opening defined by a bearing surface portion in the form of an inturned narrow flange 32 of an inside diameter which relatively closely clears the outside diameter of the ring body 17, as best seen in FIG. 4. The bearing clearance of the bearing flange 32 is substantially less than the diametrical clearance differential between the inside diameter of the anti-friction member coils and the outside diameter of the ring body 17. As a result, the bearing flanges 32 assist in maintaining a free revolving clearance of the anti-friction member coils with respect to the ring body 17.

In addition, the end cap members 30 provide end bearing surfaces for the anti-friction coil member 29 opposing retaining stops which may conveniently be in the form of respective cotter pins 33 extending through aligned holes 34 in the ring body 17 for each end of the anti-friction member.

In use, the hose bears against the anti-friction sleeve member 29 and as the hose is drawn through the eye of the guide ring 10, frictional engagement of the hose with the outside diameter surfaces of the anti-friction member causes the latter to revolve about the ring member body 17. Where any of the anti-friction member coils touch the ring member body bar structure due to weight or pressure of the hose against the anti-friction member, such contact is so limited by the relatively larger inside diameter of the anti-friction member coils with respect to the outside diameter of the ring body 17, and by the general centering effect of the bearings 32, that any frictional resistance between such contacting coils and the ring member body is inconsequential and does not interfere with substantially friction-free revolution of the anti-friction coil sleeve member 29.

In the form of FIGURES 8, 9 and 10, an arrangement is provided wherein a generally C-shaped guide ring body 35 supports in substantially friction-free relation a helically coiled hose guide sleeve 37 of substantially the same construction and functioning substantially the same as the anti-friction sleeve member 29 already described. End caps 38, substantially the same as the end caps 30, and retaining stops comprising respective cotter pins 39 similar to the cotter pins 33 maintain the endwise orientation of the anti-friction sleeve 37 relative to the body member 35.

While one end of the guide ring body 35 is free and offset upwardly and outwardly with respect to the opposite end of the body 35, such opposite end is mounted in a manner to support the body in outwardly projecting relation from a support such as a wall 40 into overlying relation to a hose reel 41 as shown in FIGURES 8 and 9, or in a downwardly hanging relation as shown in FIGURE 10. To this end, a generally L-shaped bracket 42 is secured rigidly to the attached end portion of the tubular body 35 to project away from the eye of the body ring loop substantially as shown. A rigid connection between the body 35 and the bracket 42 may be effected by projection welding as shown in FIGURES 9 and 10, wherein the end of the bracket member 42, which is in the form of a plate of substantial width, has initially a plurality of welding boss projections 42a on its end providing material to effect a thorough weld joint 43.

Means are provided for effecting a swivel hinge joint of the bracket 42 with a mount in the form of a bracket plate 44 having marginal flanges 45 at opposite ends turned to engage as spacers with the supporting wall 40 to which the bracket plate is secured as by means of screws 47. For this purpose, the bracket 42 has a substantially right angular flange portion 48 extending in the same direction as the free end portion of the guide ring is offset from the plane of the attached end portion of the guide ring body 35. A swivel and hinge connection between the bracket flange 48 and the bracket plate 44 is effected by a swivel and hinge connector 49 in the form of a substantially hat-shaped member which may be made as a metal stamping having a generally cup-shaped body of a diameter to fit loosely through a circular bearing hole 50 in the bracket plate 44 and provided on the open end of its substantially cylindrical wall with an outturned retaining flange 51 engageable with the inside face of the margin defining the aperture 50 with the swivel hinge member projecting outwardly through the opening 50. Transversely aligned longitudinal slots 52 in the cylindrical wall of the member 49 opening through the open end of the member and terminating adjacent to the closed end of the member are provided to engage hingedly therein a hinge bar 53 provided at the free end of the bracket flange 48 by a clearance opening 54 in the bracket flange. By reason of the resilience of the two portions of the swivel hinge member 49 separated by the slots 52, assembly of the swivel hinge member with the bracket plate 44 after the bracket hinge bar portion 53 has been assembled therewith can easily be effected by resiliently deflecting the separated portions toward one another as shown in dash outline in FIGURE 9 and inserting the same through the bracket plate opening 50 until the flanges 51 have cleared through the opening and then allowing the separated portions to spring back to normal position wherein the flanges 51 retainingly engage with the bracket plate 44 as shown in FIGURE 9. As a result, the bracket 42 through the hinge bar portion 53 thereof is supported both hingedly and swivelly by the hinge-swivel member 49.

In use, it is desirable that the ring guide assembly be disposed as shown in FIGURES 8 and 9 wherein the guide ring body 35 is supported in an outwardly projecting position overlying the reel 41 and with the bight of the body encompassed by the anti-friction sleeve 37 located about midway between the planes of the opposite rims of the reel. Thereby, a hose 41a is not only efficiently guided as it is drawn out, but is also adapted efficiently to be reeled in by drawing it toward the reel over the anti-friction sleeve 37. It has been found that when thus supported, the free end of the guide ring body 35 may be spaced substantially from the bracket-connected end of the body, as shown, since the weight of the hose adequately tends to move the portion of the hose in engagement with the anti-friction sleeve 37 downwardly away from the upwardly offset free end of the ring assembly. This substantially prevents escape of the hose from the ring guide while the hose is being drawn off of the reel or being wound back on the reel in a direction transverse to the reel rims. On the other hand, should the direction of reel-off or reeling-in change to be generally between the rims of the reel, so that the ring guide is not needed the hose can be readily disengaged or will automatically disengage when the hose extends away from the opening between the ends of the guide body 35.

During the in-use disposition of the ring guide assembly, the hinge-bar flange 48 of the bracket 42 provides a shoulder adjacent juncture with the main body portion of the bracket thrusting against the opposing portion of the attachment bracket plate 44, the hinge-swivel member 49 being for this purpose mounted on an upper portion of the bracket plate 44. Thereby, in the in-use position the bracket 42 hanging from the hinge bar 53 and supporting the guide body 35 cantilever-fashion, thrusts inwardly toward the bracket plate 44 below the member 49.

In order to lock the device against swinging about the swivel axis of the swivel-hinge member 49 while in use, an interlock socket aperture 55 is provided in the proximal end portion of the bracket flange 48 to receive an outwardly projecting interlock lug 57 on the supporting bracket plate 44. As shown, the interlock aperture 55 may be a lower extension of the aperture 54. The interlock lug 57 may be formed as a struck-out tab projection from the bracket plate 44.

When the ring guide member is not in use, it is desirable to swing it down into an out of the way position. The arrangement disclosed enables this to be done quite easily and efficiently, by simply lifting up on the ring guide portion of the device to swing it up about the axis of the hinge bar 53 until the bracket 42 is released from the interlock lug 57, and then swiveling the device by free turning of the member 49, substantially as indicated in dash outline in FIGURE 8, through 180°, and then allowing the device to drop freely into a depending position as shown in FIGURE 10. Return to the erected, cantilever projecting disposition of the device for use is readily effected by reversal of the collapsing movements just described. After the device has been placed in the erected position, the hose 41a is readily looped thereover, by threading the hose up through the eye of the device or by swinging a loop of the hose through the gap between the ends of the body 35.

In the modification of FIGURE 11, a functionally similar construction of the ring guide and bracket structure as in FIGURES 8-10 is shown, but a generally hook-shaped ring loop body 58 is disclosed which is formed integrally in one piece with a bracket 59 having an angular connecting flange 60 thereon. In this form, the ring body 58 and the bracket 59 are formed from a single piece of sheet metal of suitable grade and gauge, die shaped into form, the ring body 58 being provided with a suitable outside diameter, in this instance substantially cylindrical, to provide a proper freely engageable bearing for an anti-friction sleeve member 61 which may be the same as and function the same as the anti-friction sleeves 29 and 37 already described.

Since it may be necessary in order to enable convenient die forming of the device to shape the same from thinner gauge stock than may be used for the separately formed and attached bracket 42, the bracket 59 may be reinforced by suitable marginal longitudinally extending reinforcing ribs 62 pressed therein, substantially as shown. In addition, a reinforcing rib 63 may be provided extending centrally from the bracket 59 and merging with the connected end of the ring body 58. Thereby, a substantially rigid structure is provided.

Mounting and use of the guide ring and integral bracket 58, 59 is substantially the same as in the form of FIGURES 8-10, and the same swivel-hinge member and attaching bracket plate may be used. For connection with the swivel hinge member a hinge bar 64 is provided on the distal end of the bracket flange 60, by providing a clearance aperture 65 in the flange. An interlock aperture 67 is formed in the proximal end portion of the flange 60 to receive the interlock lug of the supporting bracket plate. Thereby, the form of the hose guide ring structure as depicted in FIGURE 11 is interchangeable with the counterpart in FIGURES 8-10.

It will be understood that modifications and variations may be effected without departing from the scope of the novel concepts of the present invention.

I claim as my invention:

1. In a hose guide structure, a generally ring shaped body of circular outside diameter cross-section, and an anti-friction flexible helically coiled sleeve disposed rotatably about a portion of said body and engageable by a hose that may be guidedly drawn through the eye defined by the ring shaped body.

2. In a hose guide structure, a generally ring shaped body of circular outside diameter cross-section, and an anti-friction flexible sleeve disposed rotatably about a portion of said body and engageable by a hose that may be guidedly drawn through the eye defined by the ring shaped body, said anti-friction sleeve comprising a flexible helically coiled member having the coils separated from one another to avoid binding as the sleeve revolves on the ring body.

3. In a hose guide structure, a generally ring shaped member defining a hose guide eye, said ring shaped body having an anti-friction sleeve rotatable about a portion thereof and engageable by a hose drawn through said eye, said sleeve having on its opposite ends bearing members maintaining a spaced relation of the sleeve about the ring body at least in the end portions of the sleeve.

4. In a hose guiding structure, a generally ring shaped body of circular outside diameter cross-section, a substantial segment of said body having disposed revolvably thereabout a flexible helically coiled sleeve to provide an anti-friction member directly engageably by a hose drawn through the eye of the guide member, said sleeve having end caps threadedly secured thereon, and said end caps having central clearance openings for passage therethrough of the ring body and said openings being defined by bearing surfaces opposing the ring body.

5. In a hose guiding structure, a generally ring shaped body providing an outside diameter bearing and defining a hose eye, a substantial segment of said body having disposed revolvably thereabout a flexible helically coiled sleeve to provide an anti-friction member directly engageable by a hose drawn through said eye, said sleeve having end caps secured thereon, said end caps having central clearance openings for passage therethrough of the body and said openings being defined by bearing surfaces opposing the body bearing, and said body having stop members thereon opposing said end caps and thereby retaining the sleeve against endwise displacement on the body.

6. A hose guide structure comprising a generally ring shaped member providing a guide eye for a hose drawn therethrough, means for supporting the member, anti-friction means carried by the member to be engaged by a hose drawn through the ring eye and over the anti-friction means, said supporting means comprising a bracket on which the ring member is supported to swing between collapsed and generally outwardly projecting positions, the bracket including a rigid portion extending from said member, a separate bracket portion to be secured to a support, and a hinge-swivel connector connecting said rigid portion and said separate bracket portion and enabling swinging and swivelling of the member between erected and collapsed positions, said connector comprising a generally hat-shaped member having flanged retaining end portions separated by longitudinal transversely aligned hinge slots and sprung into retained interengagement within an aperture in said separately formed bracket portion and projecting outwardly therefrom and having a hinge bar portion on said rigid bracket portion engaged within said hinge slot.

References Cited in the file of this patent

UNITED STATES PATENTS

| | | |
|---|---|---|
| 736,130 | Mitchell | Aug. 11, 1903 |
| 1,171,562 | Timberlake | Feb. 15, 1916 |
| 1,995,340 | Buxton | Mar. 26, 1935 |
| 2,721,412 | Smiley | Oct. 25, 1955 |
| 2,770,499 | Rapisarda | Nov. 13, 1956 |
| 2,933,264 | Bullen | Apr. 19, 1960 |

FOREIGN PATENTS

| | | |
|---|---|---|
| 435,117 | Great Britain | Sept. 16, 1935 |